July 28, 1964 J. F. SCHUH 3,142,827
STORING GENERATOR

Filed Dec. 16, 1960 2 Sheets-Sheet 1

INVENTOR
JAN. F. SCHUH
BY
AGENT

__United States Patent Office__ 3,142,827
Patented July 28, 1964

3,142,827
STORING GENERATOR
Jan Frederik Schuh, Eindhoven, Netherlands, assignor to North American Philips Company, Inc., New York, N.Y., a corporation of Delaware
Filed Dec. 16, 1960, Ser. No. 76,370
Claims priority, application Netherlands Dec. 24, 1959
3 Claims. (Cl. 340—174)

The invention relates to a storing generator having cocking terminals, firing terminals and an output terminal. The generator contains a (preferably annular) core made of a material having a rectangular magnetic hysteresis loop and a transistor. The core is provided with cocking windings connected to the cocking terminals, firing windings connected to the firing terminals, a feedback winding connected through the transistor to the output terminal, and a control winding having one end connected to a voltage source and the other end connected to a controlling electrode of the transistor. The generator is arranged so that energization of the cocking windings drives the core to a magnetic condition which will be referred to as the state 1, while energization of the firing windings drives the core to the state 0. The flipping over of the core from the state 1 to the state 0 induces in the control winding a voltage such that the transistor, which is normally maintained non-conducting by the voltage source, becomes conducting. The current flowing through the feedback winding as a result of this causes the core to flip over completely to the state 1. Such a generator has been described in I.R.E. Convention Record number 4, 1955, pages 84 to 94 ("A transistor magnetic core circuit; a new device applied to digital computing techniques," by S. S. Guterman and W. M. Carey, Jr., more particularly FIG. 1C). United States Patent No. 3,015,-742, which issued on January 2, 1962, describes an improvement of this generator enabling a certain disadvantage thereof to be eliminated. The improvement described in said patent is independent of the invention described hereinafter and may be used in combination therewith.

The generator described by Guterman and Carey may also be provided with two or more cocking windings each connected to a separate cocking terminal, whilst the arrangement may be proportioned so that the core can only be set to the state 1 if simultaneously two (or, as the case may be, three) of the cocking windings are energized by a current pulse having a determined value and duration (cocking in double or triple coincidence). However, it may be of advantage to have available a pulse amplifier provided with two or more groups of cocking terminals which is set to the cocked condition by a coincidence within the same group of cocking terminals but not by a coincidence between cocking terminals of different groups. According to the invention, this is ensured in that the core is divided into two or more cores, the firing terminals provided on those cores and relating to the same firing terminal being connected in series as are the feedback windings or control windings provided on said cores. Only one cocking winding provided on one of the cores is connected to each cocking terminal so that the cocking terminals can be divided into groups each corresponding with one of the cores and conversely a group of cocking terminals corresponds with each core.

An embodiment of the invention given by way of example and an application thereof will now be described more fully with reference to the drawings.

Figure 1:
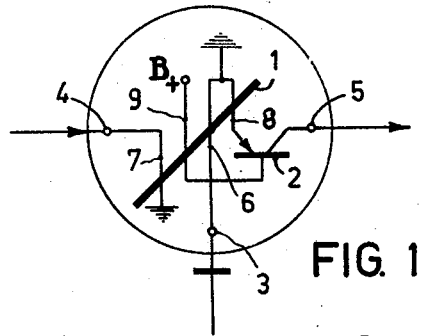
FIG. 1 shows the circuit diagram of the storing generator described by Guterman and Carey.

In FIG. 1, reference numeral 1 denotes a ring of a material having a rectangular magnetic hysteresis loop, 2 a pnp-transistor, 3 a cocking terminal, 4 a firing terminal, 5 an output terminal, 6 a cocking winding connected to the cocking terminal, 7 a firing winding connected to the firing terminal, 8 a feedback winding connected to the output terminal 5 through the emitter-collector path of the transistor 2 and 9 a control winding one end of which is connected to a positive voltage source B+ while the other end is connected to the base of the transistor 2. The winding senses of the various windings are shown by the manners in which the lines representing said windings intersect the heavy line representing the core which is assumed to be annular. Each winding is shown as a wire passing once through the ring, in actual fact, however, each winding may have a number of turns. Possible values of the generator are described in co-pending United States patent application Serial No. 819,076, filed June 8, 1959, now Patent No. 3,079,589.

The generator operates as follows. It is assumed that the generator is in the non-cocked condition (core 1 state 0). By applying a current pulse of a certain polarity and sufficient strength and duration to the cocking terminal 3, the generator is set to the cocked condition (core 1 in state 1). The voltage induced in the control winding 9 by the core 1 flipping over drives the base of the transistor 2 still further positive so that the transistor 2 remains cut off. If now a pulse is applied to the firing terminal 4, the core 1 starts to flip over and the voltage induced as a result in the control winding 9 overcomes the voltage supplied by the voltage source B+. Consequently, the base of the transistor 2 is driven negative and the transistor becomes conducting, that is to say, the output terminal 5 delivers a current pulse. The current flowing through the feedback winding 8 drives the core 1 also to the state 0 so that this current can take over the function of the firing pulse. Even if the firing pulse ceases before the core 1 has reached the state 0, the core will continue to pass to the state 0 until this state is reached, since in this event the function of the firing pulse is completely taken over by the current passed through the feedback winding 8 by the transistor 2. As soon as the core 1 has reached the state 0, however, no longer a voltage is induced in the control winding 9 so that the base of the transistor again becomes positive and the transistor does no longer supply current to the output terminal 5. Thus, the effect is that the generator when fired delivers a current pulse as output pulse. By proper proportioning, this output pulse may be given a sharply defined amplitude and duration within certain limits. The firing pulse need not satisfy any requirement other than that it drives the core 1 sufficiently far into the steep part of its magnetization curve for a voltage to be induced in the control winding 9 which overcomes the voltage of the voltage source B+ and consequently drives the voltage of the base of the transistor 2 negative. Obviously, the cocking pulse must be sufficiently strong to set the core 1 completely to the state 1. Furthermore, it can be readily deduced that the firing of a generator which has been fired and not cocked again has no effect.

Figures 2, 3:
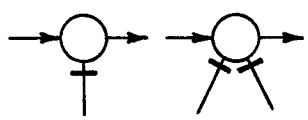
FIGS. 2 to 7 show the symbols used for these types of generators.
Figures 4, 5:
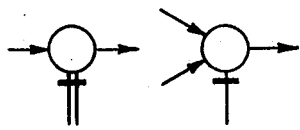
Figures 6, 7, 8:
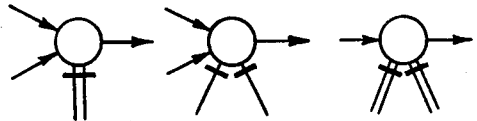
FIG. 8 shows the symbol for a generator in accordance with the invention.

FIG. 2 shows the symbol used for a storing generator. The cocking terminal is indicated by a cross line, the firing terminal by an arrow pointing towards a circle representing the generator, and the output terminal by an arrow pointing away from this circle. As an alternative, the generator may have two or more cocking terminals each connected to a separate cocking winding. The turns numbers of these cocking windings may be chosen so that the generator is set to the cocked condition of a cocking pulse is applied to any of its cocking terminals (non-coupled cocking terminals; symbol FIG. 3), however, these numbers may alternatively be chosen so that the generator is set to the cocked condition only if a cocking pulse is applied to two of the cocking terminals (coupled cocking terminals; cocking in coincidence; symbol FIG. 4). Obviously, the generator may also be provided with two or more firing terminals each connected to a separate firing winding (symbol FIG. 5). This generator can be fired by applying a firing pulse to any of its firing terminals. FIG. 6 shows the symbol for a generator having two firing terminals and two coupled cocking terminals. FIG. 7 shows the symbol for a generator having two firing terminals and two non-coupled cocking terminals.

However, it may alternatively be useful to have available a storing generator having two or more groups of coupled cocking terminals which can only be set to the cocked condition by applying a cocking pulse to at least two cocking terminals of the same group of cocking terminals, but which is not set to the cocked condition by applying a cocking pulse to two cocking terminals belonging to different groups. FIG. 8 shows, by way of example, the symbol for a storing generator having two pairs of coupled cocking terminals. The generator is set to the cocked condition only if cocking pulses are applied to two coupled cocking terminals of the same pair. It is not set to the cocked condition if a cocking pulse is applied to a cocking terminal of one pair and a cocking pulse is applied to a cocking terminal of the other pair.

Figure 9:
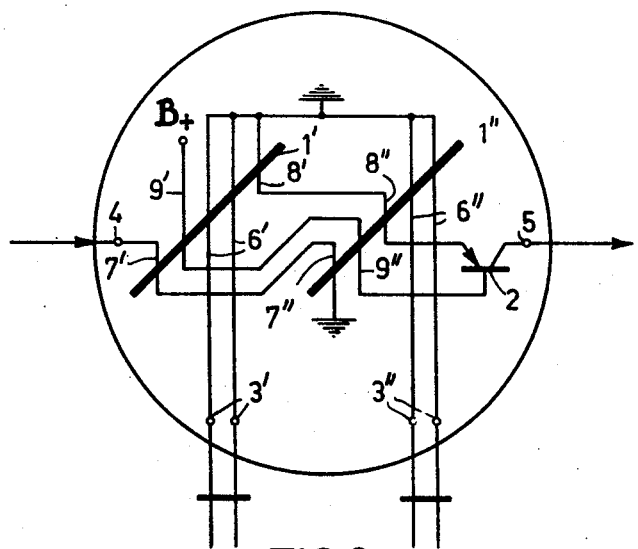
FIG. 9 is a circuit diagram of a possible embodiment of this generator.

FIG. 9 shows the circuit arrangement of the generator indicated symbolically by FIG. 8. The difference from the circuit arrangement of FIG. 1 firstly consists in that the annular core 1 is divided into two cores 1' and 1" each provided with a firing winding 7' and 7", a feedback winding 8' and 8" and a control winding 9' and 9", respectively. The windings 7' and 7" are connected in series as are the windings 8' and 8" and 9' and 9", the series combinations being further connected similarly to the corresponding windings of the circuit arrangement shown in FIG. 1. However, the cocking windings 6' connected to the pair of coupled cocking terminals 3' are provided only on the core 1' and the cocking windings 6" connected to the other pair of coupled cocking terminals 3" are provided only on the core 1". It will be appreciated that this generator when fired delivers an output pulse only if the core 1' or the core 1" is in the state 1 (or both cores are in the state 1). The core 1', however, can only be set to the state 1 by a coincidence of cocking pulses at the cocking terminals 3', the core 1" can only be set to the state 1 by a coincidence of cocking pulses at the cocking terminals 3". The coincidence of a cocking pulse applied to either of the two terminals 3' and a cocking pulse applied to either of the two terminals 3", however, sets neither the core 1' nor the core 1" to the state 1 so that the generator remains in the non-cocked condition.

Figure 10:
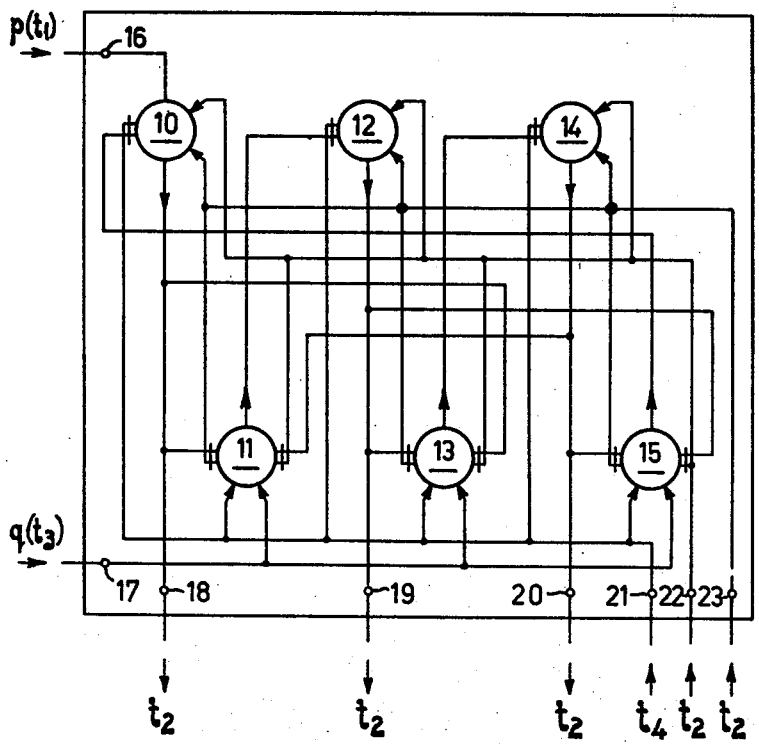
FIG. 10 is a circuit diagram of a circulating shift register using generators in accordance with the invention.

FIG. 10 is a circuit diagram of a circulating shift register using generators of the type shown in FIG. 9. In this register the information can circulate both forward and backward. The register comprises six storing generators 10, 11, 12, 13, 14, 15 which are adapted to be cocked in coincidence and constitute a closed ring both in the said sequence and in the sequence 14, 11, 12, 15, 10, 13. The generators 10, 12, 14 can be fired by applying a firing pulse either to a supply terminal 23 or to a supply terminal 22. It is assumed that these firing pulses occur at instants $t_2$ of recurrent pulse cycles. If these pulses are applied to the supply terminal 23, the information stored in the generators 10, 12, 14 is transferred in coincidence to the generators 11, 13, 15. Let us consider, for example, the generator 10. If the information 1 is stored in this generator, that is to say, if this generator is in the cocked condition, on being fired it delivers an output pulse which in coincidence with the firing pulse itself cocks the generator 11, that is to say, it stores the information 1 therein. If, however, the information 0 is stored in the generator 10, that is to say, if it is in the non-cocked condition, it does not deliver an output pulse when fired and the genreator 11 is not cocked in coincidence, that is to say, the information 0 is stored therein. Thus, the information of the generator 10 is transferred to the generator 11. The same applies to the pairs of generators 12, 13 and 14, 15. If subsequently at an instant $t_4$ of the pulse cycle concerned a pulse is applied to the supply terminal 21, the generators 11, 13, 15 are fired so that in a manner similar to that described hereinbefore, the information stored in these generators is transferred to the generators 12, 14, 10. The ultimate result is that the information is cyclically shifted one step to the right.

If at the instant $t_2$ of the pulse cycles the firing pulses are not applied to the supply terminal 23, but to the supply terminal 22, the information stored in the generators 10, 12, 14 is transferred to the generators 13, 15, 11. By a firing pulse applied to the supply 21 at the next instant $t_4$ the information stored in the last-mentioned generators is again transferred to the generators 14, 10, 12 in other words, the information now is cyclically shifted one step to the left. In both cases, the generators 11, 13, 15 act as auxiliary generators.

The circuit arrangement may also be used for supplying in cyclic sequence pulses to three output terminals 18, 19, 20 which for this purpose are connected to the output terminals of the generators 10, 12, 14.

For convenience, the windings fed from the same supply terminal or output terminal are drawn in parallel connection. Actually, they are connected in series since the sources concerned are current sources.

What is claimed is:
1. A storing pulse generator having a plurality of groups of coupled cocking terminals, comprising first and second cores of magnetic material having a rectangular hysteresis loop, a transistor having input, common and output electrodes, each of said cores having at least a firing winding, a control winding, a feedback winding, and a plurality of cocking windings, a firing terminal, means connecting said firing windings in series to said firing terminal, means connecting said control windings in series to said input electrode, means connecting said feedback windings in series to said output electrode, one of said electrodes being a collector electrode, an output terminal, means connecting said output terminal to said collector electrode, a plurality of cocking terminals, and means connecting said cocking terminals to separate cocking windings, whereby said cores may be set only upon the simultaneous occurrence of signals at at least two cocking terminals corresponding to the respective core.

2. A shift register comprising a plurality of first storing generators each having at least two firing terminals, an output terminal, and first and second coupled cocking terminals, a plurality of second storing generators each having at least a firing terminal, an output terminal, third and fourth coupled cocking terminals, and fifth and sixth coupled cocking terminals, means for simultaneously applying first pulses to said first firing terminals and to said third cocking terminals, means for simultaneously applying second pulses to said second firing terminals and to said fifth cocking terminals, means connecting the output terminals of said first storing generators to said fourth and sixth cocking terminals whereby each output terminal of said first storing generator is connected to a separate fourth cocking terminal of one second storing generator and to a separate sixth cocking terminal of another second storing generator, means connecting the output terminal of each second storing generator to a separate first cocking terminal, and means applying third pulses simultaneously to said firing terminals of said second storing generators and to said second cocking terminals, whereby said first and second pulses transfer the states of said first storing generators to said second storing generators in a different order, and said third pulses transfer the states of said second storing generators to said first storing generators.

3. The shift register of claim 2, in which said second storing generators each comprise first and second cores of magnetic material having a rectangular hysteresis loop, a transistor having input, common and output electrodes, each of said cores having at least a firing winding, a control winding, a feedback winding, and a plurality of cocking windings, a firing terminal, means connecting said firing windings in series to said firing terminal, means connecting said control windings in series to said input electrode, means connecting said feedback windings in series to said output electrode, one of said electrodes being a collector electrode, an output terminal, means connecting said output terminal to said collector electrode, a plurality of cocking terminals, and means connecting said cocking terminals to separate cocking windings, whereby said cores may be set only upon the simultaneous occurrence of signals at at least two cocking terminals corresponding to the respective core.

References Cited in the file of this patent

UNITED STATES PATENTS 3,015,742   Hormann _____ Jan. 2, 1962

OTHER REFERENCES

A Transistor-Magnetic Core Circuit, by Guterman and Carey, I.R.E. Convention Record, 1955, part 4, pp. 84–94.